United States Patent
Yoo

(10) Patent No.: US 8,691,420 B2
(45) Date of Patent: Apr. 8, 2014

(54) BATTERY PACK

(75) Inventor: Dae Hyeong Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 693 days.

(21) Appl. No.: 12/503,148

(22) Filed: Jul. 15, 2009

(65) Prior Publication Data

US 2010/0075216 A1    Mar. 25, 2010

(30) Foreign Application Priority Data

Sep. 19, 2008  (KR) .................................. 2008-92000

(51) Int. Cl.
*H01M 2/10* (2006.01)
*H01M 6/42* (2006.01)

(52) U.S. Cl.
USPC ................ 429/151; 429/97; 429/99; 429/100

(58) Field of Classification Search
USPC ................................ 429/96, 97, 99, 100, 151
See application file for complete search history.

(56) References Cited

U.S. PATENT DOCUMENTS

| | | | |
|---|---|---|---|
| 5,401,591 A | 3/1995 | Bishay et al. | |
| 6,068,946 A | 5/2000 | Zedell, Jr. et al. | |
| 7,141,330 B2 | 11/2006 | Aoyama | |
| 7,316,863 B2 | 1/2008 | Sato | |
| 2003/0053289 A1 | 3/2003 | Tanaka et al. | |
| 2003/0211382 A1 | 11/2003 | Aoyama | |
| 2006/0176014 A1 | 8/2006 | Moon | |
| 2007/0111088 A1 | 5/2007 | Kim | |
| 2009/0072785 A1 | 3/2009 | Moon | |

FOREIGN PATENT DOCUMENTS

| | | |
|---|---|---|
| CN | 1442912 | 9/2003 |
| JP | 2001-266824 | 9/2001 |
| JP | 2003-068263 | 3/2003 |
| JP | 2003-257388 | 9/2003 |
| JP | 2004-319314 | 11/2004 |
| JP | 2007-335330 | 12/2007 |
| JP | 2008-112660 | 5/2008 |
| JP | 2008-140730 | 6/2008 |
| KR | 1998-020357 | 7/1998 |
| KR | 10-2004-0086796 | 10/2004 |
| KR | 10-2006-0011175 | 2/2006 |
| KR | 10-2007-0027351 | 3/2007 |
| KR | 10-2008-0005894 | 1/2008 |
| TW | M308509 | 3/2007 |

OTHER PUBLICATIONS

Chinese Office Action issued Sep. 22, 2011 Patent Application No. 200910151482.X with English translation.

*Primary Examiner* — Jonathan G Leong
(74) *Attorney, Agent, or Firm* — Knobbe, Martens, Olson & Bear, LLP

(57) ABSTRACT

A battery pack that allows easy application of injection molding in the formation of a battery case and is capable of improving fastening strength of the case components. For this purpose, the battery pack comprises a plurality of battery cells; a circuit module electrically connected to the plurality of battery cells; and a case accommodating the plurality of battery cells and the circuit module, wherein the case includes a first case shaped in the form of an open box and having a plurality of coupling protrusions formed thereon and a second case shaped in the form of an open box and having a plurality of coupling holes engaging with the plurality of coupling protrusions in order to couple the second case with the first case.

19 Claims, 6 Drawing Sheets

BATTERY PACK

CROSS-REFERENCE TO RELATED APPLICATION

This application claims the benefit of Korean Patent Application No. 2008-92000, filed on Sep. 19, 2008 in the Korean Intellectual Property Office, the disclosure of which is incorporated herein by reference.

BACKGROUND OF THE INVENTION

1. Field of the Invention

Aspects of the present invention relate to a battery pack. More specifically, aspects of the present invention relate to a battery pack that allows easy application of injection molding to the formation of a battery case with improved bonding strength of the case components.

2. Description of the Related Art

Generally, a battery pack, which is used in portable electronic devices such as notebook computers, Personal Digital Assistants (PDAs) and camcorders, is fabricated in a bundle structure of multiple battery cells because of the limited capacity of a single battery cell. Such a battery pack is composed of a first case, a second case coupled to the first case, a plurality of battery cells housed in a space defined by the first and second cases, and a protective circuit board installed at one side of the battery cell and controlling charge/discharge of the battery. The battery pack is installed in electronic devices to supply a power source for the electronic devices.

In connection with such a conventional battery pack, the first case and the second case are connected by an additional adhesive or the like, so the battery pack may be easily susceptible to structural deformation or separation of the two case members by an external force. Accordingly, there is a need for development of a novel battery pack structure providing a direct physical connection between the first case and the second case of the battery pack. However, such a novel structure for the first and second cases should also be fabricated in a shape that can be installed in the electronic equipment and can be easily fabricated via injection molding.

SUMMARY OF THE INVENTION

Aspects of the present invention provide a battery pack that enables easy application of injection molding to the formation of a battery case with improved bonding strength of the case components.

The battery pack comprises a plurality of battery cells; a circuit module electrically connected to the battery cells; and a case for accommodating the battery cells and the circuit module, wherein the case includes a first case shaped in the form of an open box and having a plurality of coupling protrusions formed thereon and a second case shaped in the form of an open box, coupled with the first case, and having a plurality of coupling holes for engaging with the plurality of coupling protrusions.

The plurality of coupling protrusions are formed on one side of the first case, and the first case may further include a barrier formed apart from the one side in the protruding direction of the coupling protrusion. The barrier may be a fixing wall that prevents displacement of the battery cells by dividing the plurality of battery cells into groups. A spacing distance between the one side of the first case and the barrier may be 3 to 10 times larger than the protrusion widths of the plurality of coupling protrusions projecting from the one side of the first case. Preferably, the spacing distance between the one side of the first case and the barrier may be in the range of 3 mm to 10 mm.

The plurality of coupling protrusions is formed in groups on one side of the first case, and neighboring groups of coupling protrusions may be spaced apart from one another. The barrier may be positioned corresponding to the spacing region between the neighboring groups of coupling protrusions on one side of the first case.

The first case has guide walls corresponding to each group of the plurality of coupling protrusions, and each guide wall may include a guide extension side extending in the protruding direction of the coupling protrusion from one side of the first case, a guide lateral side bending and extending from the guide extension side, and a guide groove formed on the guide lateral side in a region corresponding to the coupling protrusion.

The first case includes a placement surface and a first lateral side that includes first long lateral sides bending and extending from opposite long sides of the placement surface and first short lateral sides bending and extending from opposite short sides of the placement surface and connecting the first long lateral sides, wherein the plurality of coupling protrusions may be formed in groups of predetermined numbers on one long lateral side of the first long lateral sides.

The first case further includes guide walls corresponding to each group of the plurality of coupling protrusions and structures extending parallel to the first short lateral sides in the placement surface for dividing the battery cells into groups, wherein the guide wall includes a guide extension side extending in the protruding direction of the coupling protrusion from the one long lateral side, a guide lateral side bending and extending from the guide extension side, and a guide groove formed on the guide lateral side in the region corresponding to the coupling protrusion.

The first case may further include a rib side extending parallel to the other long lateral side of the first long lateral sides and the first short lateral sides inside the placement surface; a plurality of auxiliary holes formed on the rib side; a first isolation wall extending parallel to the other long lateral side inside the placement surface interposing the rib side, and then forming an installation space of a circuit module to isolate the circuit module from the battery cells inside the first case; and a first connector-exposing groove formed on the other long lateral side.

The second case has a protrusion portion on one side thereof and includes a cover surface that is faced opposite to the placement surface and has a main surface, a stepped surface bending and extending from the main surface and a minor surface bending from the stepped surface and extending parallel to the main surface; and a second lateral side including second long lateral sides bending and extending from opposite long sides of the cover surface and second short lateral sides bending and extending from opposite short sides of the cover surface and connecting the second long lateral sides, wherein the distance between the one long lateral side of the second long lateral sides and the stepped surface inside the second case may be shorter than the distance between the other long lateral side of the second long lateral sides and the stepped surface.

The plurality of coupling holes may be formed on one long lateral side of the second case at positions corresponding to the plurality of coupling protrusions, such that the plurality of coupling holes can be engaged with the plurality of coupling protrusions. One long lateral side of the second case may be inserted into the space formed between the one long lateral side and the guide wall of the first case.

The second case may further include a plurality of auxiliary protrusions formed on the other long lateral side of the second long lateral sides and the second short lateral sides; a second isolation wall formed corresponding to the first isolation wall of the first case, extending parallel to the other long lateral side of the second long lateral sides inside the cover surface interposing the auxiliary protrusions, for isolating the circuit module from the battery cells inside the second case; and a second connector-exposing groove provided on the other long lateral side of the second long lateral sides and formed corresponding to the first connector-exposing groove such that a connector installed on the circuit module of the case can be exposed to the outside.

The battery pack may be a plurality of cylindrical lithium ion batteries.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
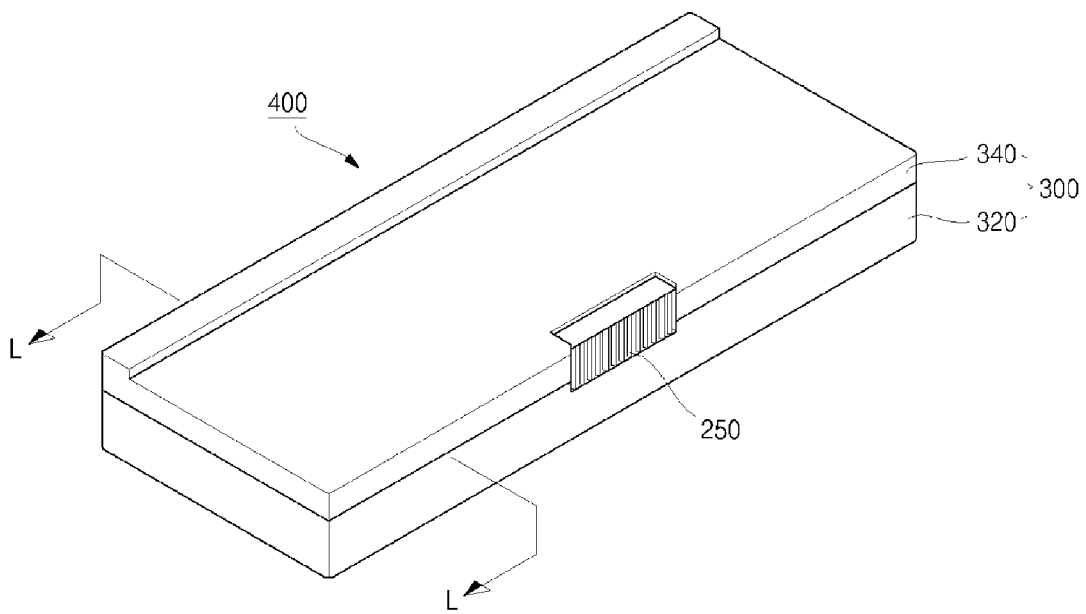
FIG. 1 is a perspective view of a battery pack in accordance with an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
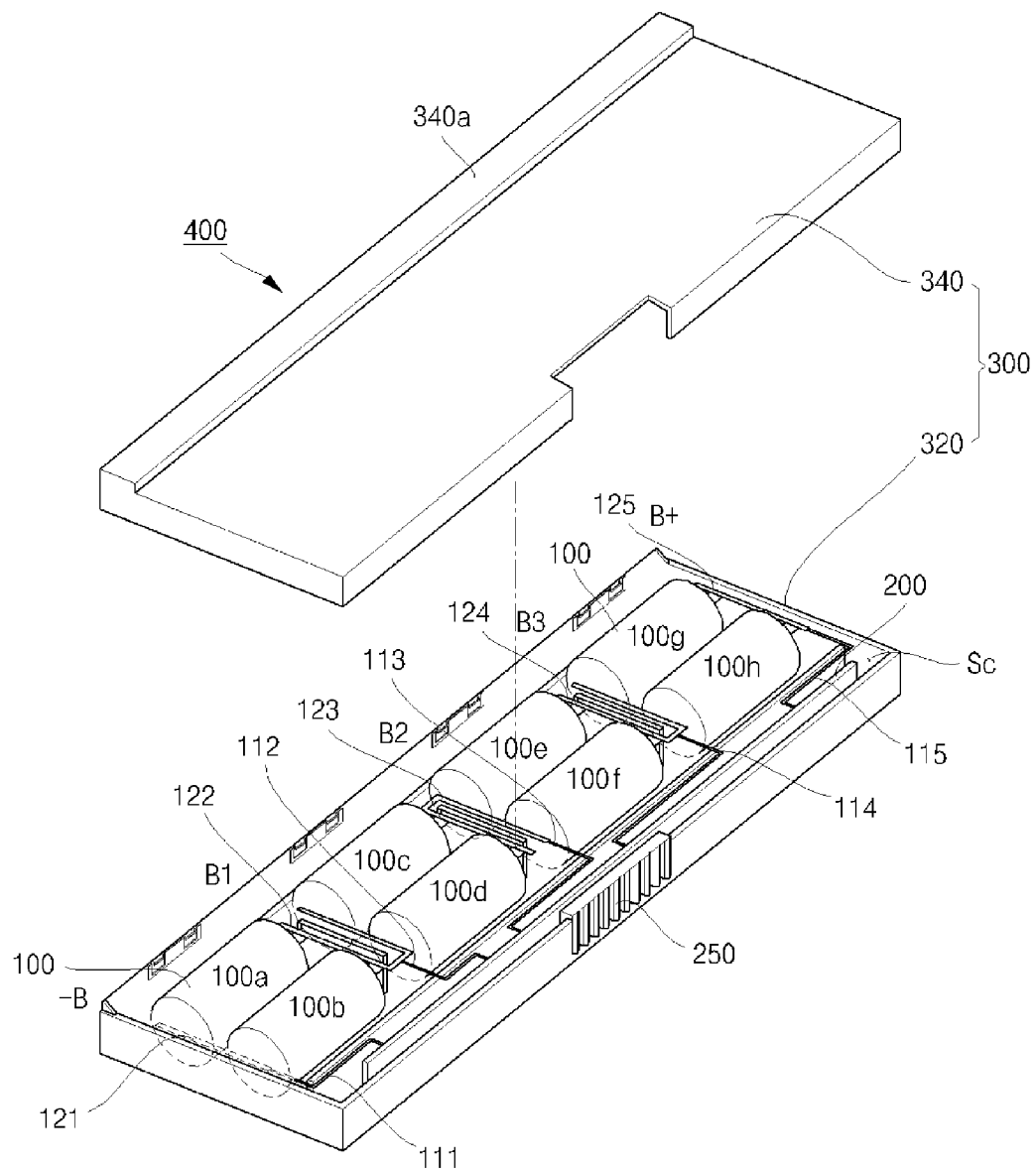
FIG. 2 is an exploded perspective view of the battery pack shown in FIG. 1.
Figure 3:
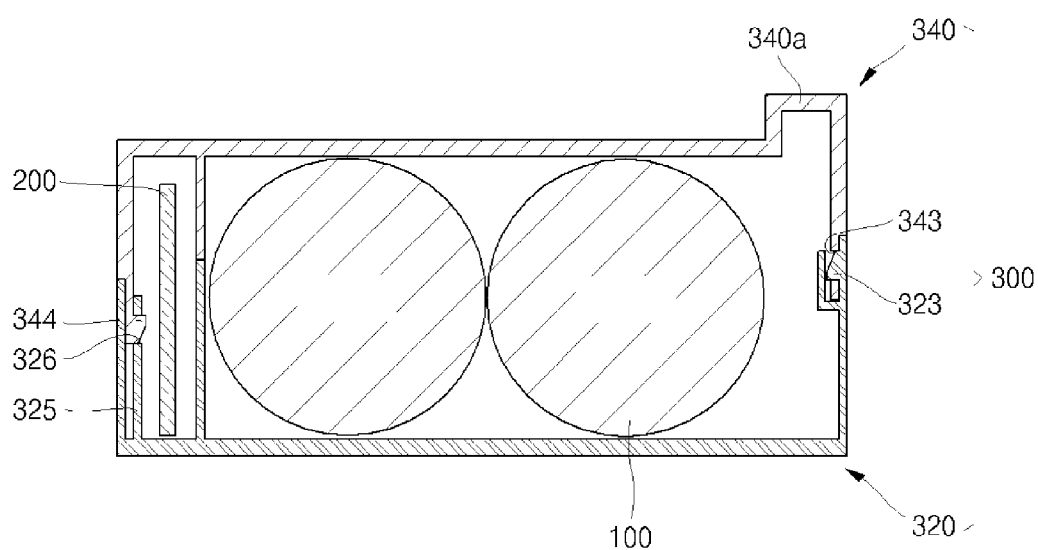
FIG. 3 is a sectional view of the battery pack taken along line L-L of FIG. 1.

FIG. 1 is a perspective view of a battery pack in accordance with an embodiment of the present invention, FIG. 2 is an exploded perspective view of the battery pack shown in FIG. 1, and FIG. 3 is a sectional view of the battery pack taken along line L-L of FIG. 1. Unlike a primary battery which is not rechargeable, a secondary battery that is capable of undergoing charge/discharge cycles for repeated use thereof is fabricated in the form of a battery pack 400 and is widely used as a power source for electronic equipment such as notebook computers, PDAs, camcorders and the like. The battery pack 400 shown in the accompanying drawings is only exemplary and may be embodied in various forms.

Referring to FIGS. 1 and 2, the battery pack 400 in accordance with an embodiment of the present invention includes a plurality of battery cells 100, a circuit module 200 electrically connected to the battery cells 100, and a case 300 for accommodating the battery cells 100 and the circuit module 200. The battery cells 100 are each designed to ensure that a top surface and a bottom surface have opposite polarity. In the drawings, a protruding or projecting terminal-like top surface represents a positive electrode, and a flat bottom surface represents a negative electrode. Here, it is assumed that the top surface of each battery cell 100 is electrically connected to a positive electrode of an electrode assembly (not shown) inside the cell and each bottom surface is electrically connected to a negative electrode of the electrode assembly inside the cell.

Cylindrical secondary batteries capable of undergoing repeated charge and discharge cycles may be used as the battery cells 100. Particularly preferred are cylindrical lithium secondary batteries having a high operating voltage of 3.6 V and a high energy density per unit weight. There is no particular limit to the number of the battery cells 100, even though 8 battery cells are shown in the battery pack structure of FIG. 2. In FIG. 2, the plurality of battery cells 100 is divided into a first battery cell through an eighth battery cell (100a, 100b, 100c, 100d, 100e, 100f, 100g, and 100h).

In FIG. 2, B– and B+ represent current terminals, i.e., power source sections provided at either side end of the battery cells 100 in a series or a parallel connection. Here, B– is a negative electrode power source section serving as the lowest potential terminal, and B+ is a positive electrode power source section serving as the highest potential terminal. A first conductive tab 111 and a fifth conductive tab 115 may be connected to the current terminals B– and B+ such that power can be drawn from the battery pack 400.

In addition, B1, B2 and B3 represent sensing terminals, where battery cells having different polarities are connected in series. The sensing terminals B1, B2 and B3 refer to intermediate potential terminals aligned between the highest potential terminal B+ and the lowest potential terminal B–. The sensing terminals B1, B2 and B3 may be connected with second to fourth conductive tabs 112, 113 and 114 for detection of voltages.

Specifically, a first conductive plate 121 is connected to negative electrodes of two battery cells positioned at the lower end of the battery cells 100, i.e., the lowest potential terminal. Second to fourth conductive plates 122, 123 and 124 have bent portions. With respect to the bent portion, one side of each of the conductive plates 122, 123 and 124 is fixed in contact with the top surfaces of two battery cells out of the battery cells 100, and the other side of each of the conductive plates 122, 123 and 124 is fixed in contact with the bottom surfaces of another two battery cells out of the battery cells 100, whereby four battery cells out of the battery cells 100 are connected in series and parallel fashion. A fifth conductive plate 125 is connected to the positive electrodes of two battery cells positioned at the upper end of the battery cells 100, i.e., the highest potential terminal. Examples of the material for the conductive plates 121, 122, 123, 124 and 125 include, but are not limited to, nickel (Ni), copper (Cu), aluminum (Al) and equivalents thereof. The number of the conductive plates increases corresponding to an increase in the number of the battery cells.

The circuit module 200 is electrically connected to the battery cells 100 through the first to fifth conductive plates 121, 122, 123, 124 and 125 connected to the first to fifth conductive tabs 111, 112, 113, 114, 115, and prevents the risk of overdischarge and overcharge of each battery cell 100 by controlling the charge and discharge of each battery cell 100 by a circuit (not shown) that is internally formed in connection with an external electronic device via a connector 250 that will be illustrated hereinafter. The first to fifth conductive tabs 111, 112, 113, 114 and 115 may be formed of nickel.

Alternatively, a covered conductive wire may be used for the conductive tabs 111, 112, 113, 114 and 115. There is no particular limit to the manner of connecting the circuit module 200 with the battery cells 100. Therefore, electrical connection between the circuit module 200 and the battery cells 100 may be made in various manners, depending on the shapes and modes of the battery cells 100 and circuit modules 200 to be employed.

The circuit module 200 includes a generally rectangular-shaped connector 250 on one side thereof. The connector 250 includes a body having a plurality of holes that allows electrical connection/disconnection of the connector 250 to and from the electronic device, and also includes a plurality of conductive leads (not shown) extending at a given length to the inside and rear of the holes of the body of the connector 250. The connector 250 body is formed of an insulating resin or the like to prevent an electrical short circuit between the conductive leads (not shown).

The case 300 includes a first case 320 for receiving and installing the battery cells 100 and the circuit module 200, and a second case 340 for covering the first case 320. The case 300 may be formed to conform to the shape of the electronic device when the battery pack 400 is installed in the electronic device.

The first case 320 is configured in the form of an open-topped box such that the battery cells 100 can be housed therein, and one side thereof may be provided with a circuit module installation space (Sc) formed for accommodating the circuit module 200 and connector 250. The second case 340 is shaped to have a size corresponding to the upper face of the first case 320. That is, the second case 340 is also configured in the form of an open box.

The first case 320 and the second case 340, as shown in FIG. 3, are combined in a locking structure whereby a plurality of coupling protrusions 323 formed on one side of the first case 320 are engaged with coupling holes 343 formed on the corresponding side of the second case 340, and auxiliary holes 326 formed on a rib side 325 parallel to the other side of the first case 320 are engaged with auxiliary protrusions 344 formed on the corresponding other side of the second case 340. In this manner, the battery pack 400 is configured to ensure that the case 300 accommodates the battery cells 100 and the circuit module 200. Such a battery pack 400 is installed and used in electronic devices such as notebook computers, PDAs and camcorders, as referenced above.

One side of the case 300 may be provided with a protrusion structure in conformance with a shape of the electronic device where the battery pack 400 is mounted. Alternatively, the other side of the case 300 may be designed to have a protrusion structure or different shape, or a non-protruding structure, depending on the shape of the electronic device. In an embodiment of the present invention, it is assumed that the case 300 has a shape with a protrusion portion 340a on one side of the second case 340.

Figure 4:
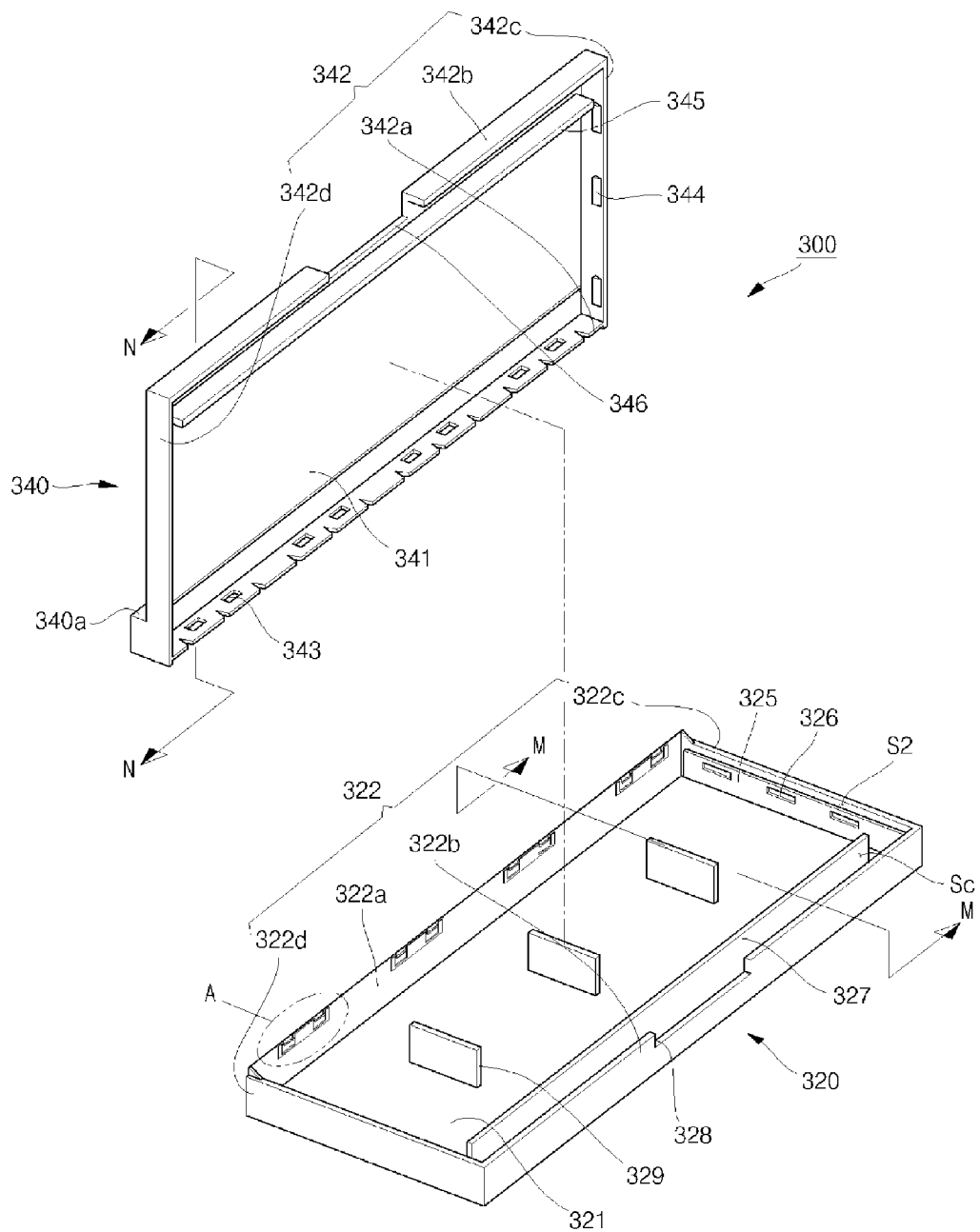
FIG. 4 is a perspective view of the case of the battery pack shown in FIG. 1.
Figure 5:
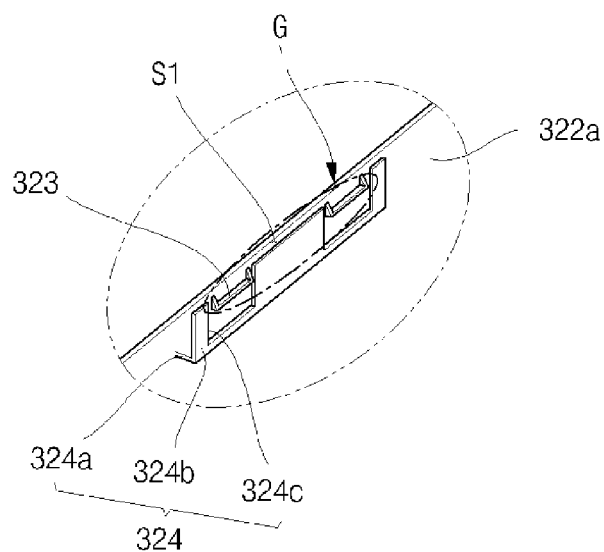
FIG. 5 is an enlarged perspective view of part 'A' shown in FIG. 4.
Figure 6:
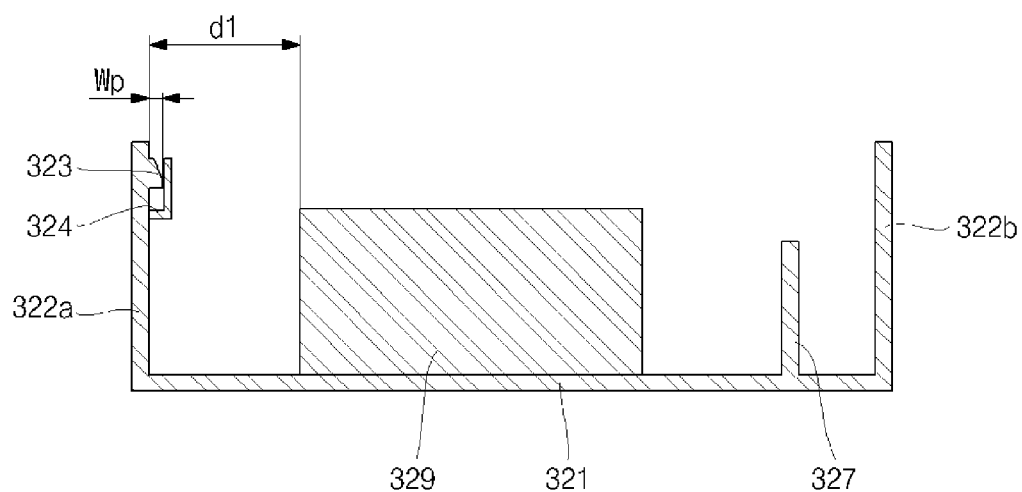
FIG. 6 is a sectional view of a first case taken along line M-M of FIG. 4.
Figure 7:
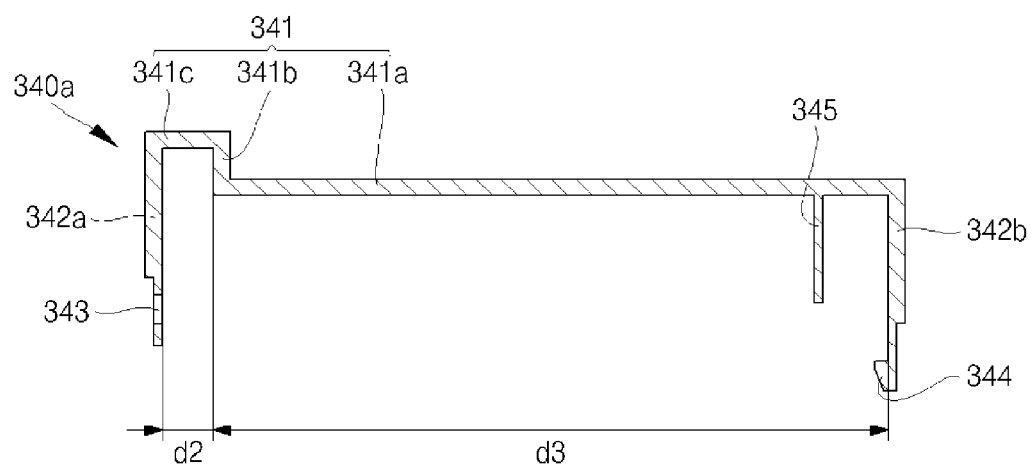
FIG. 7 is a sectional view of a second case taken along line N-N of FIG. 4.

Hereinafter, detailed description will be provided for the case 300 including the first case 320 and the second case 340 that are combined in a locking structure by engagement of the coupling protrusions 323 and the coupling holes 343. FIG. 4 is a perspective view of the case of the battery pack shown in FIG. 1, FIG. 5 is an enlarged perspective view of part 'A' shown in FIG. 4, FIG. 6 is a sectional view of a first case taken along the lines M-M of FIG. 4, and FIG. 7 is a sectional view of a second case taken along the lines N-N of FIG. 4. Referring to FIGS. 4 through 6, the first case 320 may include a placement surface 321, a first lateral side 322, a plurality of coupling protrusion 323, a guide wall 324, a plurality of rib sides 325, a plurality of auxiliary holes 326, a first isolation wall 327, a first connector-exposing groove 328 and a barrier 329. Referring to FIGS. 4 and 7, the second case 340 may include a cover surface 341, a second lateral side 342, a plurality of coupling holes 343, a plurality of auxiliary protrusions 344, a second isolation wall 345 and a second connector-exposing groove 346.

In the first case 320, the placement surface 321 is a surface where the plurality of battery cells 100 and the circuit module 200 are placed. The placement surface 321 may be flat, curved or in the shape of a stepped surface.

The first lateral side 322 is a lateral side bending and extending from edges of the placement surface 321, such that the plurality of battery cells 100 and the circuit module 200 can be enclosed. The first lateral side 322 may include first long lateral sides 322a and 322b bending and extending from opposite long sides of the placement surface 321, and first short lateral sides 322c and 322d bending and extending from opposite short sides of the placement surface 321 and connecting with the first long lateral sides 322a and 322b.

The plurality of coupling protrusions 323 is formed to protrude from the inside of one long lateral side 322a of the first long lateral sides 322. These protruding coupling protrusions 323 are engaged with coupling holes 343 of the second case 340 upon coupling of the first case 320 with the second case 340. The plurality of coupling protrusions 323 may be formed in groups (G) of two or three on one long lateral side 322a of the first case and neighboring groups (G) of coupling protrusions 323 may be spaced apart from one another. The number and shape of the coupling protrusions 323 may vary depending on the size and design of the first case 320.

The guide wall 324 is formed corresponding to each group (G) of the plural coupling protrusions 323, and forms a space (S1) between the group G and the one long lateral side 322a. The guide wall 324 ensures that the one long lateral side 342a of the second case 340, where coupling holes 343 are formed, can be fit into the space (S1). Specifically, referring to FIG. 5, the guide wall 324 may include a guide extension side 324a extending in the protruding direction of the coupling protrusion 323 from the one long lateral side 322a, a guide lateral side 324b bending and extending from the guide extension side 324a, and a guide groove 324c formed on a region corresponding to the coupling protrusion 323 in the guide lateral side 324b.

The guide extension side 324a and the guide lateral side 324b substantially define the space (S1), and the guide groove 324c serves to ensure a space for smooth engagement between the coupling protrusion 323 of the first case 320 and the coupling hole 343 of the second case 340. The rib sides 325 are formed extending parallel to the other long lateral sides 322b of the first long lateral sides 322a and 322b and parallel to the first short lateral sides 322c and 322b inside the placement surface 321. A space (S2) is formed between the rib side 325 and the other long lateral side 322b and between the rib side 325 and the first short lateral sides 322c and 322b. The space S2 is a gap wherein the other long lateral side 342b and the second short sides 342c and 342d of the second case 340 are inserted upon coupling of the first case 320 to the second case 340.

The plurality of auxiliary holes 326 is formed on the rib side 325. The auxiliary holes 326 are engaged with auxiliary protrusions 344 of the second case 340 upon coupling of the first case 320 and the second case 340, and serve to enhance bonding strength between the first case 320 and the second case 340.

The first isolation wall 327 extends parallel to the other long lateral side 322b inside the placement surface 321 interposing the rib side 325, and forms an installation space (Sc) in the circuit module 200 so as to isolate the circuit module 200 from the battery cells 100 inside the first case 320. The first connector-exposing groove 328 is formed on the other long lateral side 322b so as to externally expose the connector 250 installed in the circuit module 200.

The barrier 329 may be spaced at a predetermined distance in the protruding direction of the coupling protrusion 323 from the one long lateral side 322a. Referring to FIG. 6, a spacing distance (d1) between the one long lateral side 322a and the barrier 329 is preferably 3 through 10 times larger than the protrusion width (Wp) of the coupling protrusion 323. Typically, the protrusion width (Wp) of the coupling protrusion 323 is 1 mm or less. In this embodiment, the spacing distance (d1) between the one long lateral side 322a and the barrier 329 is preferably in the range of 3 mm through 10 mm. If the spacing distance (d1) is less than 3 mm, upon injection molding of the first case 320 it is not easy to achieve horizontal movement and release of a mold in the protruding direction of the coupling protrusion 323 from the part where the coupling protrusion 323 was formed. On the other hand, if the spacing distance (d1) exceeds 10 mm, the barrier 329 deviates excessively from the desired formation position, thus resulting in problems of design. In this embodiment, the barrier 329 may be positioned corresponding to the spacing region between the neighboring coupling protrusion groups (G) on the one long lateral side 322a. For example, the barrier 329 may be a fixing wall in order to prevent displacement of the battery cells 100 by dividing the plurality of battery cells 100 into groups. There is no particular limit to the barrier 329, as long as it is a structure formed in a region spaced apart from the one long lateral side 322a in the protruding direction of the coupling protrusion 323.

The first case 320 may be formed of an insulating resin and may be formed by injection molding. The injection molding may integrally comprise the components shown in FIGS. 4 through 6, for example, the placement surface 321, the first lateral side 322, the plurality of coupling protrusions 323, the guide wall 324, the rib side 325, the plurality of auxiliary holes 326, the first isolation wall 327, the first connector-exposing groove 328 and the barrier 329.

The second case 340 may include a cover surface 341, the second lateral side 342, the plurality of coupling holes 343, the plurality of auxiliary protrusions 344, the second isolation wall 345 and the second connector-exposing groove 346. The cover surface 341 faces opposite to the placement surface 321 of the first case 320 in the position of coupling of the first case 320 with the second case 340 (see FIG. 7). The cover surface 341 may be flat, curved or have a stepped surface. The cover surface 341 may be provided with holes (not shown) so as to dissipate heat generated from the battery cells 100. The cover surface 341 may be provided with a protrusion portion 340a. Here, the cover surface 341 may include a main surface 341a, a stepped surface 341b bending and extending from the main surface 341a, and a minor surface 341c bending from the stepped surface 341b and extending parallel to the main surface 341a.

The second lateral side 342 is a lateral side bending and extending from edges of the cover surface 341, such that the plurality of battery cells 100 and the circuit module 200 can be enclosed. The second lateral side 342 may include second long lateral sides 342a and 342b bending and extending from opposite long sides of the cover surface 341, and second short lateral sides 342c and 342d bending and extending from opposite short sides of the cover surface 341 and connecting the second long lateral sides 342a and 342b. Referring to FIG. 7, the distance (d2) between the one long lateral side 342a and the stepped surface 341b is shorter than the distance (d3) between the other long lateral side 342b and the stepped surface 341b. Here, the one long lateral side 342a and the other long lateral side 342b are of a stepped shape, and the stepped portion is inserted into the space (S1) formed between the one long lateral side 322a and the guide wall 324 of the first case 320 in the position of coupling of the first case 320 and the second case 340.

The plurality of coupling holes 343 is formed on the one long lateral side 342a. The formation of the plurality of coupling holes 343 (not coupling protrusions 324) on the one long lateral side 342a is because the one long lateral side 342a is positioned close to the stepped surface 341b formed by the protrusion portion 340a formed on the cover surface 341. That is, when the coupling holes 343 are formed on the one long lateral side 342a, the distance necessary for horizontal movement of a mold is not sufficient because of a short distance between the one long lateral side 342a and the stepped surface 341b, even though horizontal movement and release of the mold should be accomplished in the protruding direction of the coupling protrusions 323 (i.e., the direction of the stepped surface 341) from the part where the coupling protrusion was formed when the second case 340 is injection molded. The coupling holes 343, as described before, are engaged with coupling protrusions 323 of the first case 320, thus resulting in connection between the first case 320 and the second case 340. The number of coupling holes 343 corresponds with the number of coupling protrusions 323 of the first case 320, and the coupling holes 343 are formed on the one long lateral side 342a at positions corresponding to the coupling protrusions 323 of the first case 320, such that the coupling holes 343 engage with the coupling protrusions 323.

The plurality of auxiliary protrusions 344 is formed on second short lateral sides 342c and 342d and the other long lateral side 342b of the second long lateral sides 342a and 342b. Here, the formation of auxiliary protrusions 344 on the other long lateral side 342b is because the other long lateral side 342b is positioned far from the stepped surface 341b formed by the protrusion portion 340a which was formed on the cover surface 341. In other words, it is possible to design a distance necessary for the horizontal movement and release of a mold in the protruding direction of the auxiliary protrusion 344 (i.e., direction of the stepped surface 341) from the part where the auxiliary protrusion 344 was formed, upon injection molding of the second case 340. The auxiliary protrusions 344, as described before, are engaged with the auxiliary holes 326, thus additionally improving the fastening strength between the first case 320 and the second case 340.

The second isolation wall 345 extends parallel to the other long lateral side 342b inside the cover surface 341 interposing the auxiliary protrusions 344, and is formed corresponding to the first isolation wall 327 of the first case 320 so as to isolate the circuit module 200 from the battery cells 100 inside the second case 340.

The second connector-exposing groove 346 is provided on the other long lateral side 342b and may be formed opposite to the corresponding first connector-exposing groove 328 such that the connector 250 installed in the circuit module 200 can be exposed to the outside. The second case 340 may be formed of an insulating resin and may be formed by injection molding. The injection molding may also integrally comprise the components shown in FIGS. 4 and 7, for example, the cover surface 341, the second lateral side 342, the plurality of coupling holes 343, the plurality of auxiliary protrusions 344, the second isolation wall 345 and the second connector-exposing groove 346.

As described above, the battery pack 400 in accordance with an embodiment of the present invention is combined in a locking structure for connection of first and second cases 320 and 340, whereby coupling protrusions 323 of the first case 320 are engaged with coupling holes 343 of the second case 340, and auxiliary holes 326 of the first case 320 are engaged with auxiliary protrusions 344 of the second case 340. Accordingly, the battery pack 400 of these aspects of the present invention can further improve fastening strength between the first case 320 and the second case 340, as compared to adhesive connection between the first case and the second case in the conventional art. Therefore, the battery pack 400 of these aspects of the present invention can effectively prevent possible disassembly of the case 300 that could occur upon application of an external force. In addition, the battery pack 400 of these aspects of the present invention can reduce additional material costs and production processes that may result from use of an adhesive.

Further, the battery pack 400 of these aspects of the present invention enables easy release from a mold upon injection molding of the second case 340, through the formation of coupling holes 343 (not coupling protrusions) on one long lateral side of the second case 340 that is positioned close to a stepped surface 341b of the second case 340 formed by the protrusion portion 340a provided in the case 300. Therefore, the battery pack of these aspects of the present invention enables easy application of injection molding to formation of the case.

As is apparent from the above description, a battery pack in accordance with an embodiment of the present invention comprises a first case combined in a locking structure for connection with a second case and therefore can further improve fastening strength between the first case and the second case, as compared to connection of the two case components using an additional adhesive. Therefore, the battery pack of these aspects of the present invention can achieve effective prevention of possible separation of the battery case components because of an external force. In addition, the battery pack of these aspects of the present invention can reduce additional material costs and production processes resulting from use of an adhesive.

In addition, the battery pack of these aspects of the present invention allows easy separation from a mold upon injection molding of the second case, through the formation of coupling holes (not coupling protrusions) on one long lateral side of the second case that is positioned close to a stepped surface of the second case by a protrusion portion provided in the case. Therefore, the battery pack of these aspects of the present invention allows easy application of injection molding to formation of the case.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack, comprising:
   a plurality of battery cells;
   a circuit module electrically connected to the battery cells; and
   a case to accommodate the battery cells and the circuit module,
   wherein the case comprises:
   a first case shaped in the form of an open box and having a plurality of coupling protrusions each having a protrusion width formed thereon, and
   a second case shaped in the form of an open box, being coupled with the first case and having a plurality of coupling holes to engage with the plurality of coupling protrusions
   wherein the first case further comprises:
   a placement surface; and
   a first lateral side that includes first long lateral sides bending and extending from opposite long sides of the placement surface and first short lateral sides bending and extending from opposite short sides of the placement surface and connecting the first long lateral sides,
   wherein the plurality of coupling protrusions is formed in a plurality of groups of predetermined numbers on one long lateral side of the first long lateral sides and wherein the first case defines a plurality of guide walls that are separate and spaced from each other along the length of the one long lateral side on the one long lateral side of the first long lateral sides, each of the separate plurality of guide walls having grooves corresponding to the groups of coupling protrusions so that the coupling protrusions of each group are exposed via the grooves of the corresponding guide wall,
   wherein the first case further comprises:
   a plurality of rib sides including a rib side extending parallel to the other long lateral side of the first long lateral sides and at least one rib side extending parallel to the first short lateral sides inside the placement surface and a plurality of auxiliary holes formed on each of the plurality of the rib sides; and the second case further comprises a plurality of auxiliary protrusions formed on the other long lateral side of the second long lateral sides and the second short lateral sides.

2. The battery pack according to claim 1, wherein the plurality of coupling protrusions is formed on one side of the first case, and the first case further includes a barrier formed in a region spaced apart from the one side in the protruding direction of the coupling protrusion.

3. The battery pack according to claim 2, wherein the barrier is a fixing wall that prevents displacement of the battery cells by dividing the plurality of battery cells into groups.

4. The battery pack according to claim 2, wherein the spacing distance between the one side of the first case and the barrier is 3 through 10 times larger than each of the protrusion widths of the plurality of coupling protrusions projecting from the one side of the first case.

5. The battery pack according to claim 2, wherein a spacing distance between the one side of the first case and the barrier is in the range of 3 mm through 10 mm.

6. The battery pack according to claim 2, wherein the plurality of coupling protrusions is formed in groups on one side of the first case, and neighboring groups of coupling protrusions are spaced apart from one another.

7. The battery pack according to claim 6, wherein the barrier is positioned corresponding to the spacing region between the neighboring groups of coupling protrusions on one side of the first case.

8. The battery pack according to claim 6, wherein the first case has guide walls corresponding to each group of the plurality of coupling protrusions, and each guide wall includes a guide extension side extending in the protruding direction of the plurality of coupling protrusions from one side of the first case, a guide lateral side bending and extending from the guide extension side, and a guide groove formed on the guide lateral side in a region corresponding to the plurality of coupling protrusions.

9. The battery pack according to claim 1, wherein the first case further comprises:
   structures extending parallel to the first short lateral sides in the placement surface, dividing the battery cells into groups, and
   wherein each of the guide walls of the first case further comprises a guide extension side extending in the protruding direction of the plurality of coupling protrusions from the one long lateral side, a guide lateral side bending and extending from the guide extension side, and a guide groove formed on the guide lateral side in the region corresponding to the coupling protrusion.

10. The battery pack according to claim 9, wherein the first case further comprises:
   a first isolation wall extending parallel to the other long lateral side inside the placement surface interposing the rib side and forming an installation space in a circuit module to isolate the circuit module from the battery cells inside the first case; and
   a first connector-exposing groove formed on the other long lateral side.

11. The battery pack according to claim 10, wherein the second case has a protrusion portion on one side thereof and includes:
   a cover surface that is faced opposite to the placement surface and has a main surface, a stepped surface bending and extending from the main surface and a minor surface bending from the stepped surface and extending parallel to the main surface; and
   a second lateral side including second long lateral sides bending and extending from opposite long sides of the cover surface and second short lateral sides bending and extending from opposite short sides of the cover surface and connecting the second long lateral sides,
   wherein the distance between the one long lateral side of the second long lateral sides and the stepped surface inside the second case is shorter than the distance between the other long lateral side of the second long lateral sides and the stepped surface.

12. The battery pack according to claim 11, wherein the plurality of coupling holes is formed on one long lateral side of the second case at positions corresponding to the plurality of coupling protrusions, such that the plurality of coupling holes is engageable with the plurality of coupling protrusions.

13. The battery pack according to claim 12, wherein one long lateral side of the second case is inserted into a space formed between the one long lateral side and the guide wall of the first case.

14. The battery pack according to claim 12, wherein the second case further comprises:
   a second isolation wall formed corresponding to the first isolation wall of the first case, extending parallel to the other long lateral side of the second long lateral sides inside the cover surface interposing the auxiliary protrusions, to isolate the circuit module from the plurality of battery cells inside the second case; and
   a second connector-exposing groove provided on the other long lateral side of the second long lateral sides and formed corresponding to the first connector-exposing groove such that a connector installed on the circuit module of the case is exposable to the outside.

15. The battery pack according to claim 1, wherein each battery cell is a cylindrical secondary battery cell.

16. The battery pack according to claim 1, wherein the circuit module includes a connector for electrical connection to an external source.

17. The battery pack according to claim 2, wherein the barrier is a plurality of barriers preventing displacement of the plurality of battery cells.

18. The battery pack according to claim 1, wherein the placement surface is flat.

19. The battery pack according to claim 11, wherein the cover surface is flat.

* * * * *